(12) United States Patent
Lemmer et al.

(10) Patent No.: US 8,197,221 B2
(45) Date of Patent: Jun. 12, 2012

(54) PRESSURE DIFFERENTIAL MOTOR CONTROL SYSTEM AND METHOD

(76) Inventors: Thomas Lemmer, Calgary (CA); Patrick Landymore, Calgary (CA)

( * ) Notice: Subject to any disclaimer, the term of this patent is extended or adjusted under 35 U.S.C. 154(b) by 88 days.

(21) Appl. No.: 12/829,838

(22) Filed: Jul. 2, 2010

(65) Prior Publication Data
US 2011/0006133 A1    Jan. 13, 2011

(30) Foreign Application Priority Data
Jul. 10, 2009   (CA) ..................................... 2671500

(51) Int. Cl.
*F04B 49/06*    (2006.01)
(52) U.S. Cl. ......... 417/44.2; 417/44.4; 417/53; 239/332
(58) Field of Classification Search .................. 417/44.2, 417/44.4, 53; 239/332
See application file for complete search history.

(56) References Cited

U.S. PATENT DOCUMENTS

| | | | | |
|---|---|---|---|---|
| 2,408,851 | A | * | 10/1946 | Hillier et al. ..................... 417/43 |
| 2,796,761 | A | * | 6/1957 | Touchman ................. 73/114.53 |
| 3,473,727 | A | * | 10/1969 | Eastman ......................... 415/27 |
| 4,356,738 | A | * | 11/1982 | Shuler et al. .................... 74/470 |
| 4,356,971 | A | | 11/1982 | Asluman |
| 4,471,907 | A | * | 9/1984 | Gerstmann .................... 237/65 |
| 4,561,431 | A | | 12/1985 | Atkinson |
| 4,755,638 | A | | 7/1988 | Geberth, Jr. |
| 4,934,598 | A | | 6/1990 | Schnetzer et al. |
| 5,040,950 | A | | 8/1991 | Dalquist, III et al. |
| 5,062,548 | A | | 11/1991 | Hedderick et al. |
| 5,074,467 | A | | 12/1991 | Geberth |
| 5,228,622 | A | * | 7/1993 | Murphy et al. ............... 239/126 |
| 5,244,351 | A | | 9/1993 | Arnette |
| 5,320,280 | A | * | 6/1994 | Murphy et al. ............... 239/126 |
| 5,703,552 | A | * | 12/1997 | Buffet et al. .................. 335/205 |
| 5,711,483 | A | | 1/1998 | Hays |
| 5,739,429 | A | | 4/1998 | Schmitkons et al. |
| 6,259,220 | B1 | | 7/2001 | Hays et al. |
| 2005/0204828 | A1 | | 9/2005 | Lee et al. |
| 2006/0140346 | A1 | * | 6/2006 | McCarthy, Jr. ............... 378/200 |
| 2008/0017756 | A1 | | 1/2008 | Svanebjerg |
| 2008/0272150 | A1 | | 11/2008 | Hahn et al. |

FOREIGN PATENT DOCUMENTS

JP    57105579 A    7/1982

* cited by examiner

*Primary Examiner* — Charles Freay
*Assistant Examiner* — Christopher Bobish
(74) *Attorney, Agent, or Firm* — David A. Guerra

(57) ABSTRACT

A pressure differential motor control system for controlling a motor of a high volume low pressure (HVLP) spray system via a pressure differential. The pressure differential motor control system has an outlet fitting connected to a turbine assembly, and a pressure switch adapted to be activated by a pressure differential from the outlet fitting. The outlet fitting has a first section connected to the turbine assembly, a mid section featuring low and high pressure ports, a second section connected to a quick coupler hose and spray gun, and a venturi defined through the outlet fitting. The low pressure port is in communication with the venturi, and the high pressure port is in communication with the input side of the outlet fitting. The pressure switch is activated by a pressure differential from the low and high pressure ports of the outlet fitting, thereby sending a signal to a motor controller for controlling a motor of the turbine assembly.

18 Claims, 7 Drawing Sheets

PRESSURE DIFFERENTIAL MOTOR CONTROL SYSTEM AND METHOD

CROSS-REFERENCE TO RELATED APPLICATION

This application claims foreign priority benefits under 35 U.S.C. 119 to co-pending Canada patent application number 2,671,500, filed Jul. 10, 2009. This related patent application is herein incorporated by reference in its entirety.

FEDERALLY SPONSORED RESEARCH

Not applicable

SEQUENCE LISTING OR PROGRAM

Not applicable

BACKGROUND OF THE INVENTION

1. Field of the Invention

The present invention relates to a pressure differential motor control system and method for use in connection with high volume low pressure (HVLP) spraying systems, specifically in controlling motor speed by pressure differential.

2. Description of the Prior Art

Pressure differential motor control system and methods are desirable for controlling motor speed in HVLP spray systems dependent on trigger operation thereby extending component life by significantly reducing the heating effects experienced by constant high speed running of the motor.

The use of a HVLP air pressure control system is known in the prior art. The standard turbine base HVLP unit has a vacuum cleaner-like motor as an air pressure source, a hose connected to the air pressure source, and a spray gun attached to the hose. When the HVLP unit is on, the motor is constantly running which provides a constant air flow to the spray gun, which is known to one skilled in the art as a bleeder where the trigger has no effect of airflow from the air pressure source. Lower cost turbines run at a constant full speed, while more advanced and costly units may have a number of fixed speeds, or a fully variable speed with a common design theme being that the motor runs at a constant speed whether the gun is spraying or not.

Market conditions have led to the need of a spray gun system which blocks the flow of air when the spray gun trigger is released, which is known to one skilled in the art as a non-bleeder type spray system. Blocking the airflow results in the air supply motor heating considerably while the system is in a trigger-released condition. This solution is inexpensive at the time of purchase, but has led to increased motor failure and increased maintenance costs.

Most HVLP manufacturers have placed some type of vent, blow off valve or similar discharge device between the turbine/motor and spray gun to release a portion of the air pressure, and as a result have somewhat elevated temperatures and potentially reduced motor life caused by this condition. One disadvantage of this approach is that it may result in some loss of pressure at the spray gun if the vent is a simple orifice or if the vent valve tends to remain open (percolates). Another disadvantage is that since many of these discharge devices are externally mounted, there is the possibility of removal by the operator, being damaged, or being blocked, which could significantly reduce turbine motor life.

The elevated temperatures experienced during trigger closed condition is exacerbated by units which have operating pressures toward the higher end of the 0-10 PSI range. Frequently this pressure is generated by turbine motor(s) having multiple stages, but may be also generated by comparable prime movers or motors that will also have similar heating effects at these pressures when the airflow is blocked.

Some HVLP units have incorporated a motor control device which uses airflow measurements. These units measure airflow by direct method, such as impingement on a valve plate, or a dual valve system with one of the valves in the spray gun. In these units sensitivity is limited to calibration of a spring tension against the available force on the valve plate, hence integration of a system to variable speed electronics (feedback loop) would be difficult due to this design. It can be appreciated that because the valve physically opens and closes, the restriction to airflow is variable thus can cause inconsistent results with the spray gun.

While the above-described devices fulfill their respective, particular objectives and requirements, the aforementioned patents do not describe a pressure differential motor control system and method that allows controlling a HVLP motor by pressure differential. The above-identified patents make no provision for the use of a venturi to create a pressure differential which is detected and converted into a signal that is used to control motor speed. Furthermore, the present invention has all the advantages of a non-bleeder spray gun system with reduced noise and power consumption, and increased motor life.

Therefore, a need exists for a new and improved pressure differential motor control system and method that can be used for controlling a HVLP motor by pressure differential. In this regard, the present invention substantially fulfills this need. In this respect, the pressure differential motor control system and method according to the present invention substantially departs from the conventional concepts and designs of the prior art, and in doing so provide an apparatus primarily developed for the purpose of controlling a HVLP motor by pressure differential.

SUMMARY OF THE INVENTION

In view of the foregoing disadvantages inherent in the known types of HVLP air pressure control systems now present in the prior art, the present invention provides an improved pressure differential motor control system and method, and overcomes the above-mentioned disadvantages and drawbacks of the prior art. As such, the general purpose of the present invention, which will be described subsequently in greater detail, is to provide a new and improved pressure differential motor control system and method which has all the advantages of the prior art mentioned heretofore and many novel features that result in a pressure differential motor control system and method which is not anticipated, rendered obvious, suggested, or even implied by the prior art, either alone or in any combination thereof.

To attain this, the present invention essentially comprises a motor operable with a positive fluid pressure source assembly, an outlet fitting attachable and in fluid communication with the positive fluid pressure source assembly, and a switch in electrical communication with the motor. The outlet fitting has a venturi defined therethrough along a longitudinal axis of the outlet fitting, a low pressure port defined in fluid communication with the venturi, and a high pressure port in fluid communication with an exterior of the outlet fitting. The switch is in fluid communication with the low and high pressure ports of the outlet fitting, and is operable by a pressure differential from the low and high pressure ports of the outlet fitting, thereby controlling motor operations.

The pressure differential motor control system additionally incorporates a motor controller and a multi-stage switch, with the motor controller in electrical communication with the motor and the switch. The multi-stage switch is in electrical communication with the switch and the motor controller.

There has thus been outlined, rather broadly, the more important features of the invention in order that the detailed description thereof that follows may be better understood and in order that the present contribution to the art may be better appreciated.

The outlet fitting of the present invention may also include a first section, a mid section adjacent the first section, and a second section adjacent the mid section. The first section is tapered and connected to an outlet of the positive pressure fluid source assembly. The mid section has a diameter larger than the first section, and the second section has a diameter less than the mid section thereby each of which forming an edge perpendicular to the longitudinal axis of the outlet fitting. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pressure differential motor control system and method that has all of the advantages of the prior art HVLP air pressure control systems and none of the disadvantages.

It is another object of the present invention to provide a new and improved pressure differential motor control system and method that may be easily and efficiently manufactured and marketed.

An even further object of the present invention is to provide a new and improved pressure differential motor control system and method that has a low cost of manufacture with regard to both materials and labor, and which accordingly is then susceptible of low prices of sale to the consuming public, thereby making such pressure differential motor control system and method economically available to the buying public.

Still another object of the present invention is to provide a new pressure differential motor control system and method that provides in the apparatuses and methods of the prior art some of the advantages thereof, while simultaneously overcoming some of the disadvantages normally associated therewith.

Even still another object of the present invention is to provide a pressure differential motor control system and method for controlling a HVLP motor by pressure differential. This allows the motor to have a lower speed when airflow is blocked by a closed trigger condition, and then accelerate to working speed when the trigger is in an opened condition, thereby reducing the heating effects on the motor and increasing component life.

Lastly, it is an object of the present invention to provide a new and improved method of using a pressure differential motor control system to control motor operations. The method comprises the steps of producing a fluid flow by activating the motor which drives the positive fluid pressure source assembly. Then direct the fluid flow through the venturi of the outlet fitting, and decreasing the pressure of the fluid flow in the venturi by increasing the velocity of the fluid flow in the venturi. A portion of the decreased pressure fluid flow is then directed to the switch via the low pressure port, and ambient pressure exterior of the outlet fitting is directed to the switch via the high pressure port. After which, the switch is activated by a predetermined pressure differential from the low and pressure ports. A signal from the switch is used to control the motor via a motor controller.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
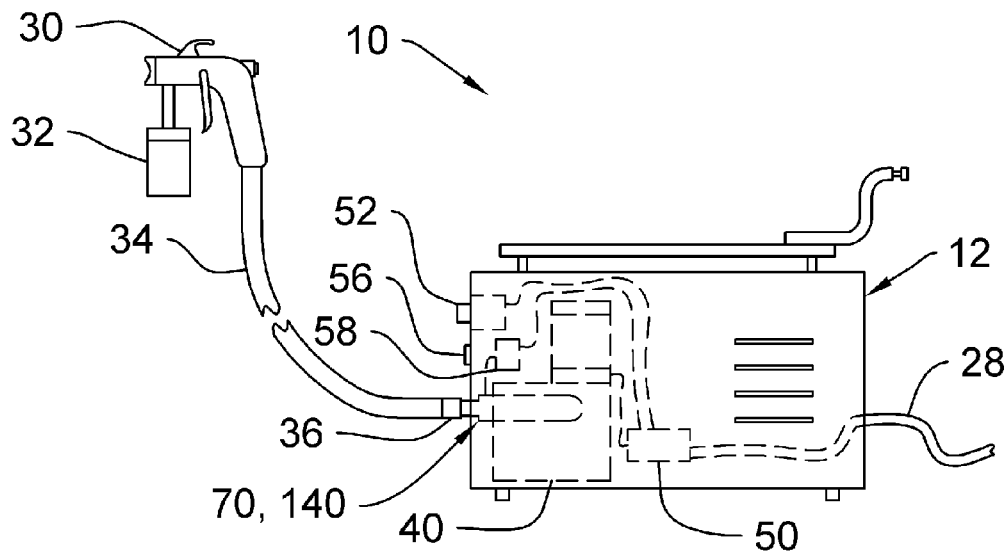
FIG. 1 is a side plane view of the pressure differential motor control system constructed in accordance with the principles of the present invention, with the phantom lines depicting environmental structure.

Referring now to the drawings, and particularly to FIGS. 1-12, embodiments of the pressure differential motor control system and method of the present invention are shown and generally designated by the reference numerals 10, 140.

In FIG. 1, a new and improved pressure differential motor control system 10 of the present invention for controlling a HVLP motor by pressure differential is illustrated and will be described. More particularly, the pressure differential motor control system 10 generally has HVLP spray system 12, a spray gun 30 featuring a container 32, and a flexible hose or conduit 34 with a quick coupler 36 connecting the spray gun 30 to the HVLP spray system 12. The HVLP spray system 12 at least includes a power supply 28, a speed controller 50, a multi-stage switch 52, a main power switch 56, a pressure switch 58, a turbine assembly 40, and an outlet fitting 70, as shown in FIG. 1.

Figure 2:
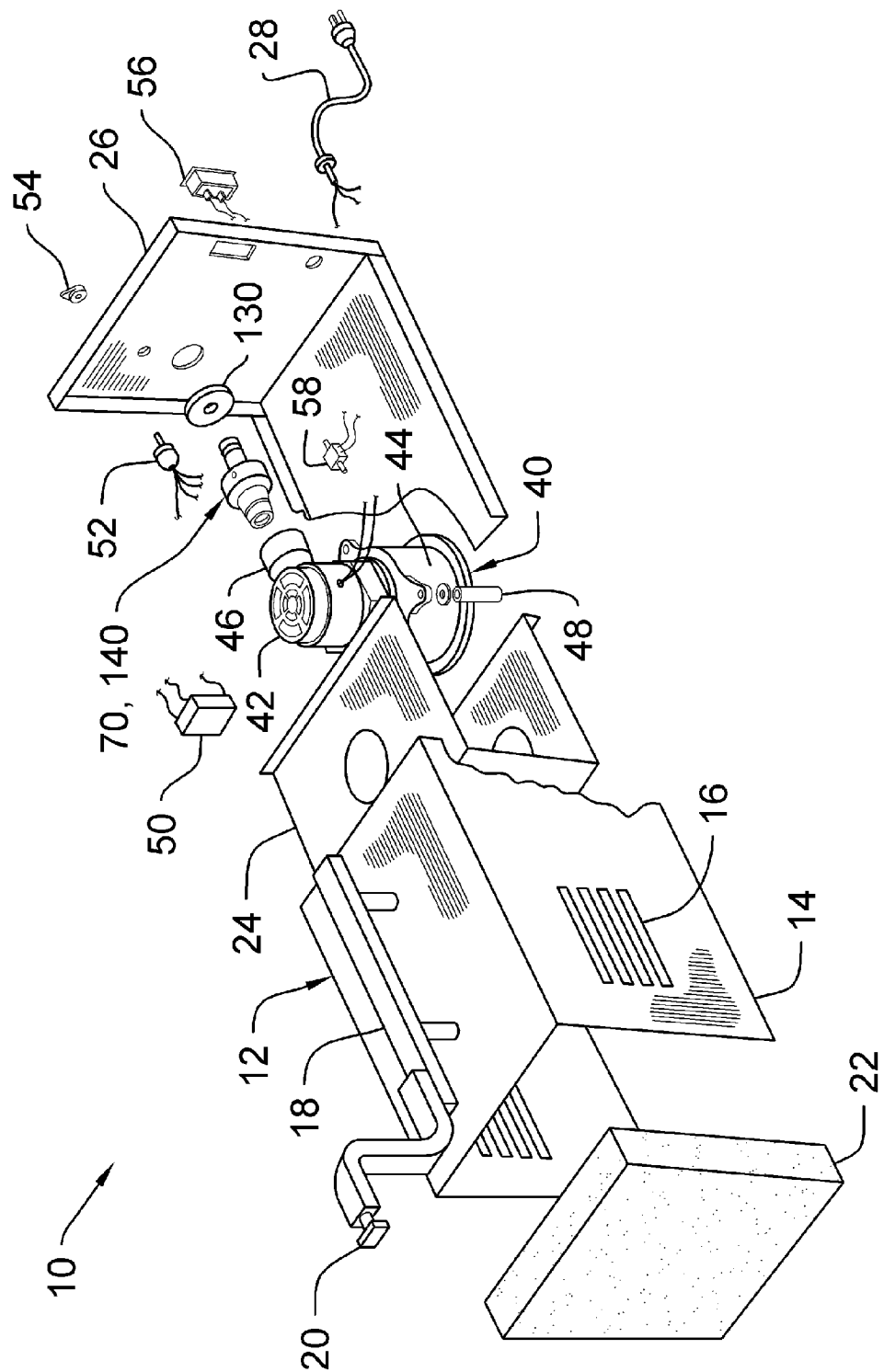
FIG. 2 is an exploded perspective view of the pressure differential motor control system of the present invention.

Regarding FIG. 2, the HVLP spray system 12 includes, but is not limited to, a cabinet 14 featuring vents 16, a handle 18 attached to the cabinet 14, a spray gun hook 20 attached and extending out from the handle 18, a filter 22 fitted to an open end of the cabinet 14, an internal support frame 24 receivable in the cabinet 14, and a cabinet panel 26 which attaches to the cabinet 14 to produce a complete enclosure. The handle 18 can be adapted to receive the flexible hose 34 coiled therearound.

The internal support frame 24 receives and supports the turbine assembly 40 by way of support 48. The turbine assembly 40 includes a motor 42 and a turbine or positive air/fluid pressure source device 44. The turbine 44 includes a turbine outlet 46 and the motor 42 drives the turbine 44 to produce airflow when the motor 42 is operating.

The outlet fitting 70 is removably and securely connected to the turbine outlet 46, with a free end of the outlet fitting 70 being removably and security fitted through the cabinet panel 26 via an outlet gasket, seal or mount 130. The multi-stage switch 52 is removably and security attached to the cabinet panel 26, and includes a knob 54 for controlling the multi-stage switch 52.

Figure 3:
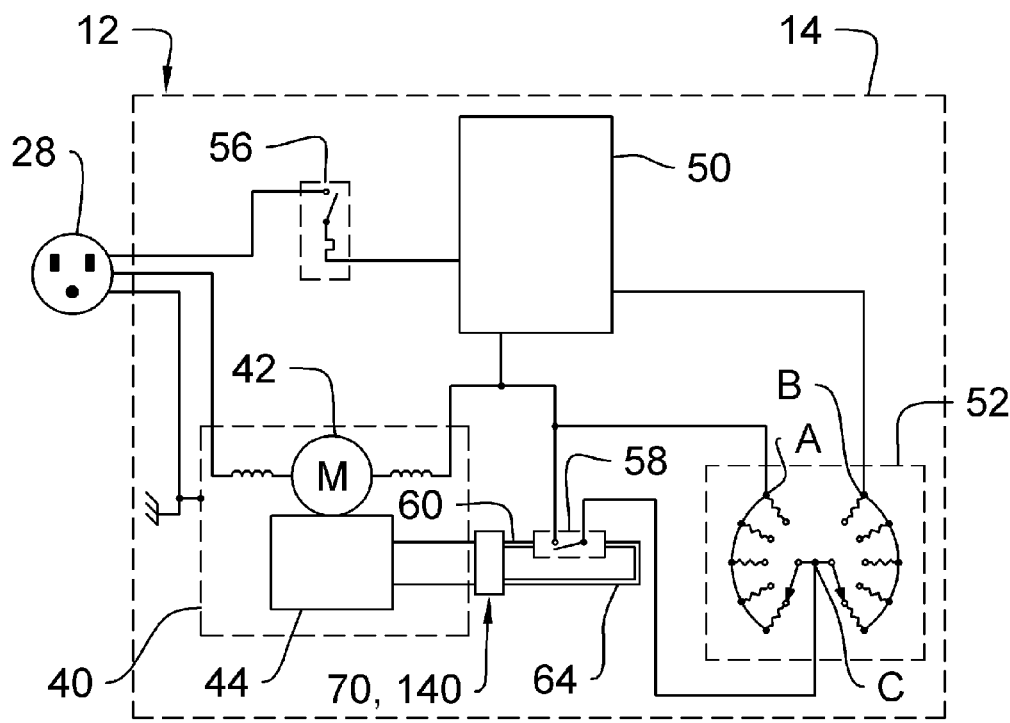
FIG. 3 is an electrical schematic showing the electrical circuitry of the pressure differential motor control system of the present invention.

Regarding FIG. 3, the electronics of the HVLP spray system 12 includes a power supply 28 connected and in electrical communication with the main power switch 56 and to the motor 42, with the power supply 28 having a ground connected to the motor 42 and/or cabinet 14. The main power switch 56 can be, but not limited to, an ElectroTechnical Applications (ETA) switch or a thermalbreaker, and is connected to and in electrical communication with the speed controller 50. The speed controller 50 is connected to and in electrical communication with the motor 42, the multi-stage switch 52, and the pressure switch 58. The pressure switch 58 can be, but is not limited to, a pressure sensing switch, pressure transducer, strain gages, or any pressure sensing device capable of delivering an electrical signal in accordance to the pressure differential within the system. Such pressure differential switches are readily available by, but not limited to, Designflex™ (SF102 Series) which provide field adjustable set point from 0.1" $H_2O$ to 25 PSI.

The pressure switch 58 is connected to and in fluid communication with the outlet fitting 70 via a high or impact pressure line 60 and a low pressure line 64, and is activated by pressure differentials created by the outlet fitting 70 which is connected to the turbine 44. The pressure switch 58 is able to operate with a pressure differential range of about 0.1 to 2.0" $H_2O$. It can be appreciated that pressure switches operating in other ranges of pressure differential can also be used.

The multi-stage switch 52 can be, but is not limited to, a 4 speed selector switch having a first component A, a second component B, and a switch component C. The first component A is connected and in electrical communication with the speed controller 50, and the second component B is connected and in electrical communication with the speed controller 50. For example, the first component A can include, but not limited to, four switch connections connected in series each via a resistor, with the first switch connection being 39K, the second switch connection being 47K, the third switch connection being 75K, and the fourth switch connection being 91K. Additionally, for example, the first component B can include, but not limited to, four switch connections connected in series each via a resistor, with the first switch connection being 91K, the second switch connection being 75K, the third switch connection being 39K, and the fourth switch connection being 0K. The switch component C can contain a switch that is associated with the first and second components A, B, thereby producing a signal differential. The pressure switch 58 is connected to and in electrical communication with the switch component C of the multi-stage switch 52.

The speed controller 50 controls the speed of the motor 42 via the main power switch 56, a signal received by the pressure switch 58 that is determined by a pressure differential created by the high and low pressure lines 60, 64, and the signal received by the multi-stage switch 52 that is created by a voltage difference from the first and second components A, B.

Figure 4:
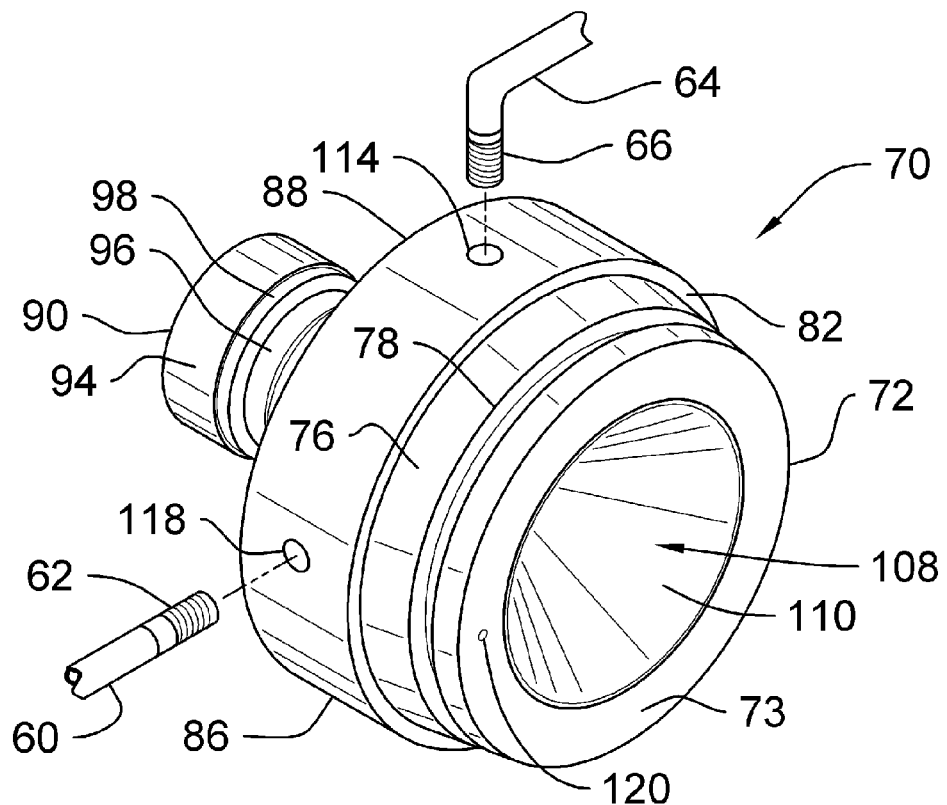
FIG. 4 is a perspective view of the outlet fitting of the pressure differential motor control system of the present invention.
Figure 5:
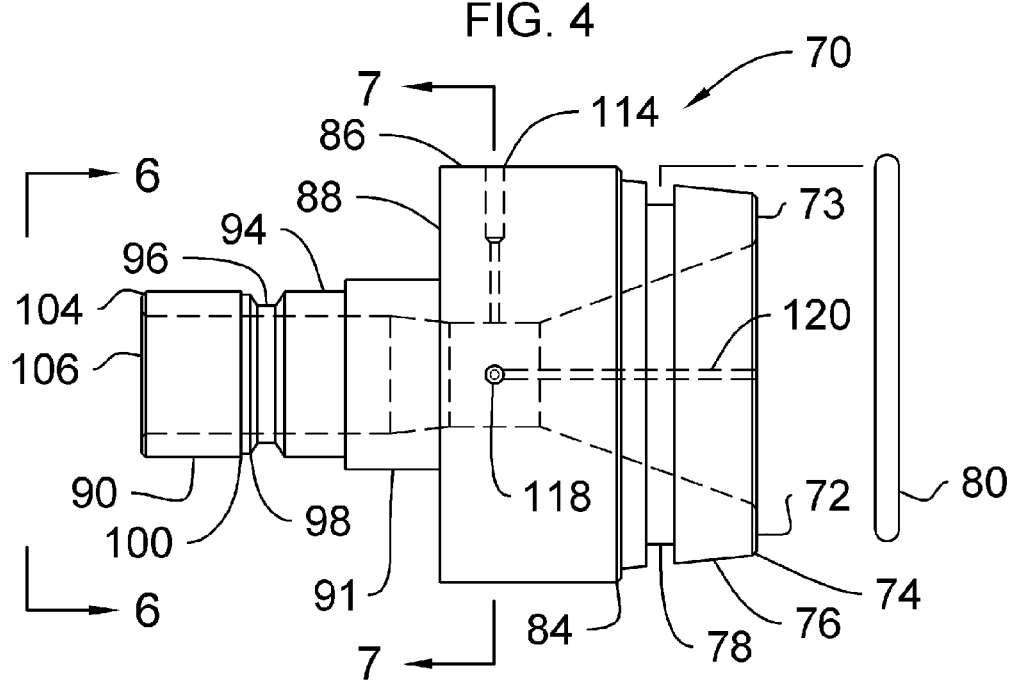
FIG. 5 is a side plane view of the outlet fitting of the pressure differential motor control system of the present invention.

Regarding FIGS. 4 and 5, the outlet fitting 70 has a turbine end section 72, a mid section 86 adjacent the turbine end section 72, a hose end section 90 adjacent the mid section 86, and a venturi 108. The turbine end section 72, mid section 86, and hose end section 90 each have a generally cylindrical configuration. The turbine end section 72 includes a planar end face 73, and a tapered section 76 adjacent the planar end face 73 via a chamfered edge 74, with the tapered section 76 tapering outwardly from the chamfered edge 74. A groove 78 is radially defined in the tapered section 76, and is adapted to receive a seal ring 80, such as but not limited to, an O-ring or gasket. The planar end face 73 includes a high or impact pressure bore 120 defined therein and through the turbine end section 72

The mid section 86 has a diameter greater than the largest diameter of the tapered section 76, thereby producing an edge 82 adjacent the tapered section 76 perpendicular to the longitudinal axis of the outlet fitting 70. A chamfered edge 84 transitions between the edge 82 and the mid section 86. A low pressure port 114 and a high or impact pressure port 118 are defined in the mid section 86. The low pressure line 64 is removably connected to the low pressure port 114 via a fitting 66, and the high pressure line 60 is removably connected to the high pressure port 118 via a fitting 62. It can be appreciated that other forms of attaching the high and low pressure lines 60, 64 to their respective ports can be used, such as but not limited to couplers, press fitting, manifolds, and clamps.

The hose end section 90 includes a first section 91 and a second section 94 adjacent the first section 91. The first section 91 is adjacent to the mid section 86 and has a diameter less than the mid section 86, thereby producing a planar edge 88 perpendicular to the longitudinal axis of the outlet fitting 70. The second section 94 has a diameter less than the first section 91 thereby producing an edge 92 perpendicular to the longitudinal axis of the outlet fitting 70. The second section 94 features a chamfered groove 96 radially defined therein, with an extension 98 that has a diameter less than the second section 94 thereby producing an edge 100 perpendicular to the longitudinal axis of the outlet fitting 70. The free end of the hose end section 90 has a planar end face 106 which is adjacent the second section 94 via a chamfered edge 104. The hose end section 90 is adapted, through the use of the first section 91, the second section 94, and groove 96, to engage with the quick coupler 36 of the flexible hose 34. It can be appreciated that other configurations of the hose end section 90 can be used to engage with different hoses fitting and coupling systems.

Figure 6:
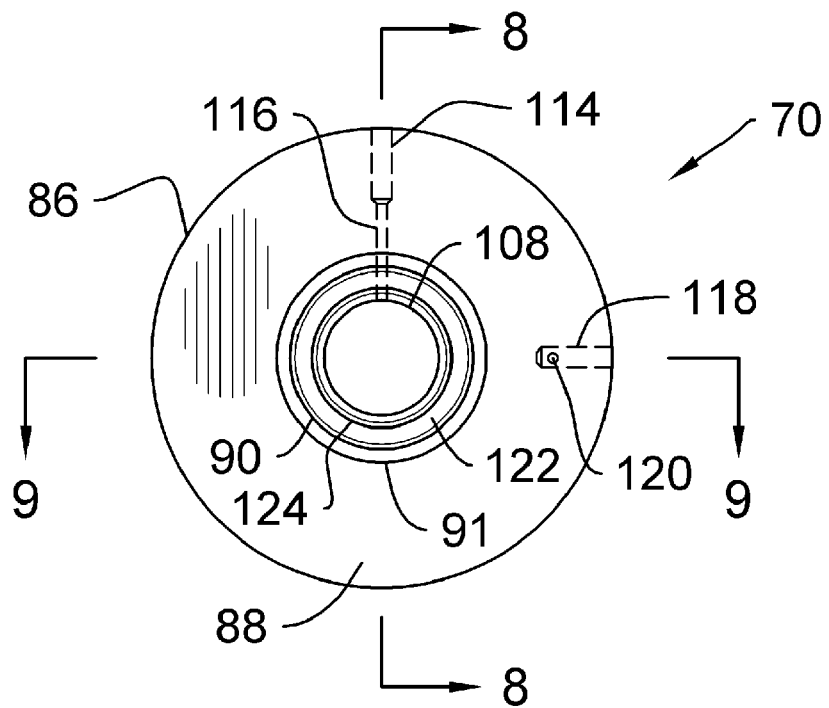
FIG. 6 is a front plane view of the outlet fitting of the pressure differential motor control system of the present invention taken along line 6-6 in FIG. 5.
Figure 7:
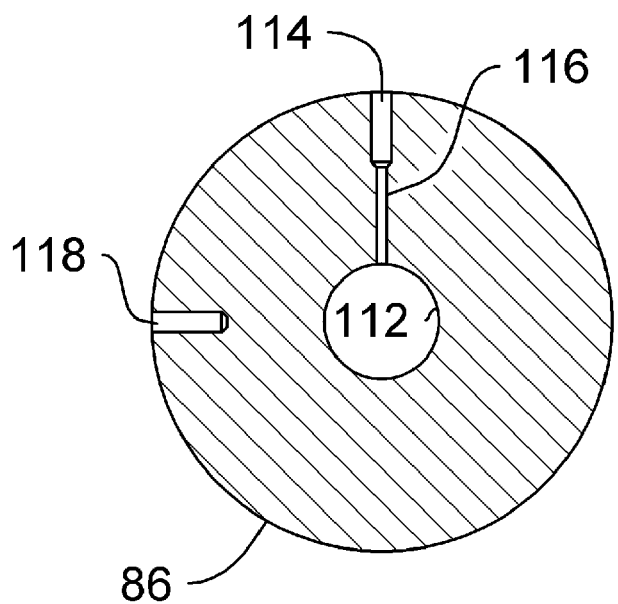
FIG. 7 is a cross-sectional view of the outlet fitting of the pressure differential motor control system of the present invention taken along line 7-7 in FIG. 5.

Regarding FIGS. 6 and 7, the low pressure port 114 extends into the mid section 86 and is in fluid communication with a low pressure bore 116 and the venturi 108. The high pressure port 118 extends into the mid section 86 and is in fluid communication with the high pressure bore 120 which runs substantially along the longitudinal axis of the outlet fitting 70 and in fluid communication with the exterior of the outlet fitting 70.

Figure 8:
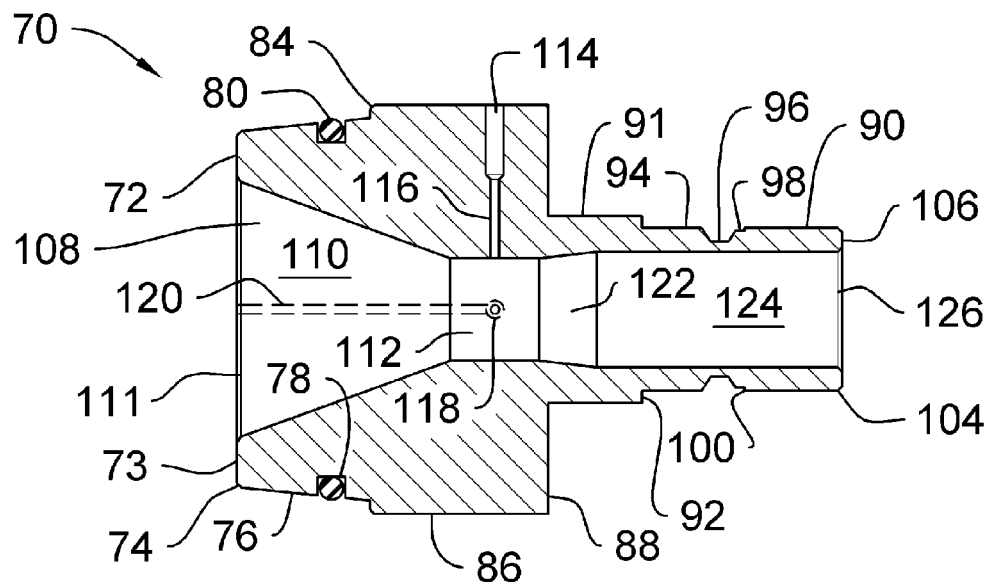
FIG. 8 is a cross-sectional view of the outlet fitting of the pressure differential motor control system of the present invention taken along line 8-8 in FIG. 6.
Figure 9:
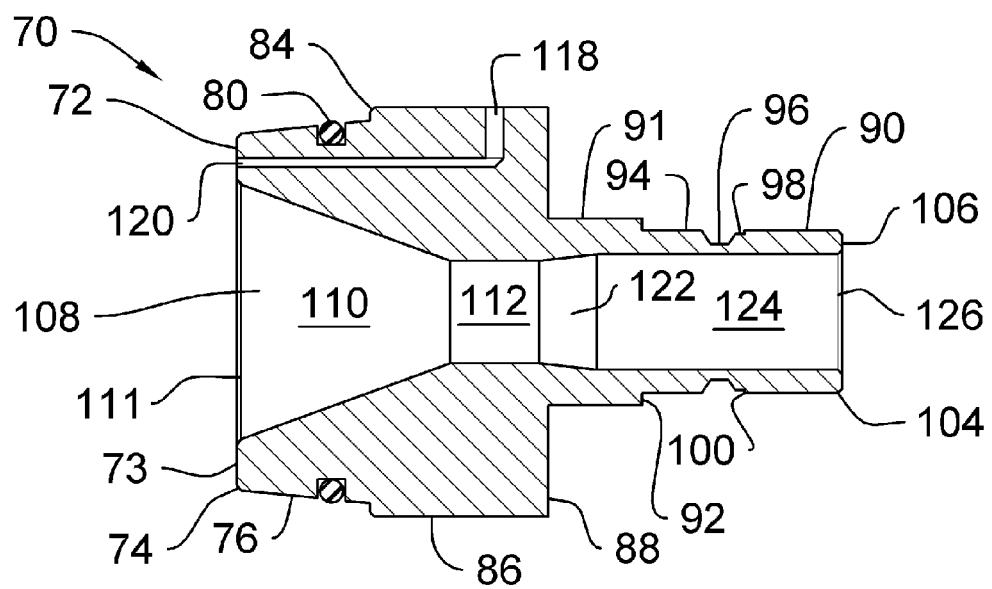
FIG. 9 is a cross-sectional view of the outlet fitting of the pressure differential motor control system of the present invention taken along line 9-9 in FIG. 6.

Regarding FIGS. 8 and 9, the outlet fitting 70 includes a centrally defined bore running the longitudinal length thereof which forms the venturi 108. The venturi 108 includes a high pressure section 110, a choked, throat or low pressure section 112, a diverging section 122, and an outlet section 124. The high pressure section 110 is defined through the turbine end section 72 and into the mid section 86. The high pressure section 110 is adjacent a chamfered opening 111 defined through the planar end face 73 of the turbine end section 76, and tapers inwardly from the chambered opening 111 in a converging manner. The high pressure section 110 can have a converging tapering angle of about 17° to 25°, preferably about 21°

The choked section 112 is adjacent and in fluid communication with the high pressure section 110 opposite the chamfered opening 111, and is defined in the mid section 86. The low pressure bore 116 is connected to and in fluid communication with the choked section 112. The choked section 112 has a diameter substantially equal to the smallest diameter of the tapered high pressure section 110.

The diverging section 122 is adjacent and in fluid communication with the choked section 112 opposite the high pressure section 110. The diverging section 122 tapers outwardly from the choked section 122 in a diverging manner, with the largest diameter of the diverging section 122 being less than the diameter of the groove 96 of the hose end section 90 of the outlet fitting 70. The diverging section 122 can have a diverging tapering angle of about 0 to 10°, preferable about 6.1°.

The outlet section 124 is adjacent and in fluid communication with the diverging section 122 opposite the choked section 112, and is parallel with the longitudinal axis of the hose end section 90 of the outlet fitting 70. The diameter of the outlet section 124 is substantially equal to the largest diameter of the diverging section 122. The outlet section 124 is in fluid communication with the exterior of the outlet fitting 70 via a chamfered opening 126 which is defined through the planar end face 106 of the hose end section 90.

It can be appreciated that the diverging section 122 can be omitted, so that the outlet section 124 extends from choked section 112 to the planar end face 106 of the hose end section 90.

Figure 10:
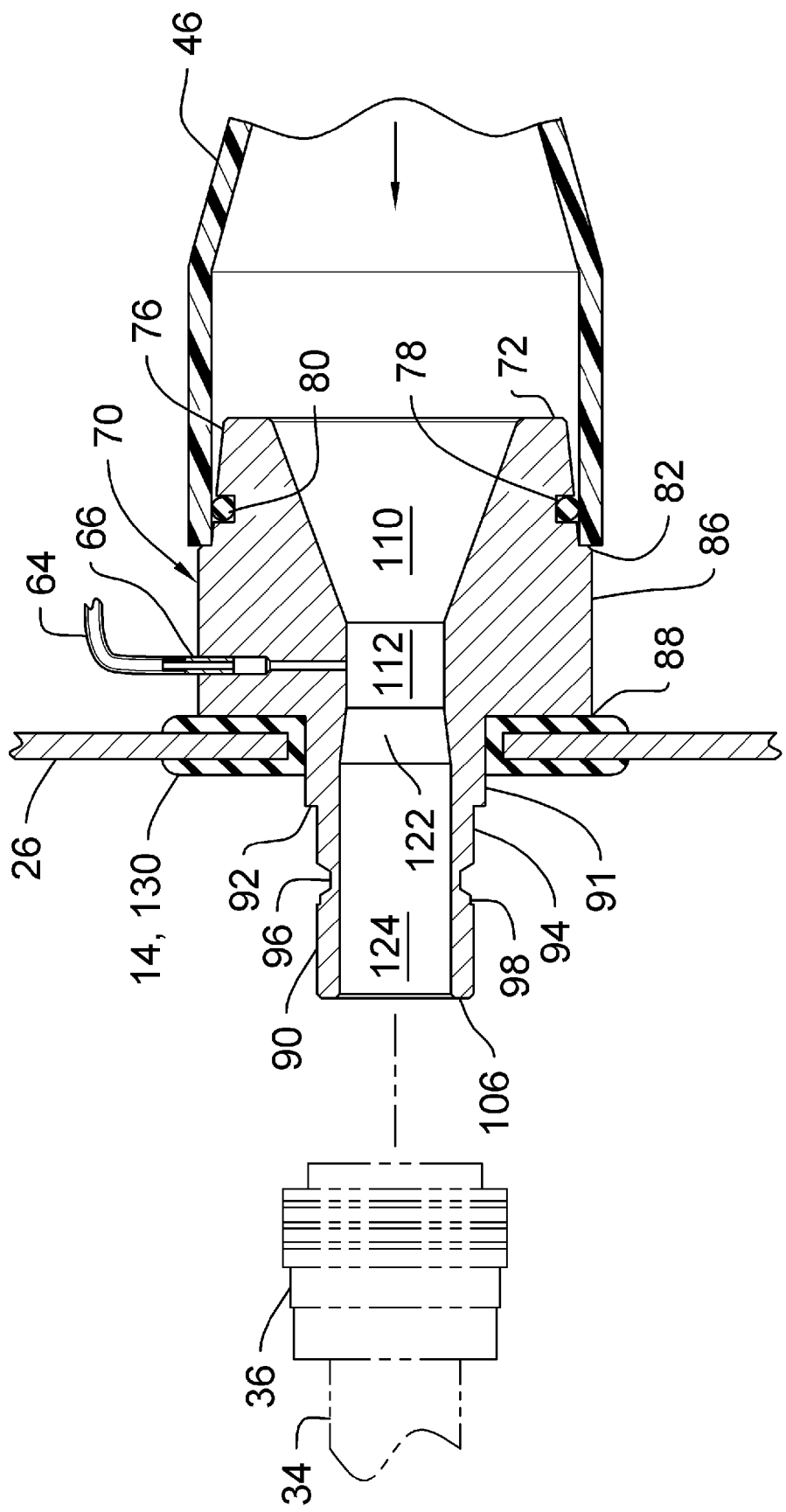
FIG. 10 is a cross-sectional view of the outlet fitting of the pressure differential motor control system of the present invention.

As best illustrated in FIG. 10, the hose end section 90 of the outlet fitting 70 is inserted through the outlet gasket 130 which securely holds the outlet fitting 70 in position against the cabinet 14 or the cabinet panel 26 with the turbine end section 72 extending into the interior of the HVLP spray system 12. The outlet gasket 130 can be, but not limited to, a rubber seal or ring. The turbine end section 72 is removably received within the turbine outlet 46 with the seal ring 80 providing a fluid tight seal against the interior of the turbine outlet 46. It can be appreciated that the turbine end section 72 can be adapted so as to receive the turbine outlet 46 therein, or that clamps or clips can be used to secure the turbine outlet 46 to the turbine end section 72. The turbine end section 72 is positioned so that the high pressure bore 120 is impacted by the airflow produced by the turbine 44.

The hose end section 90 is positioned exterior of the HVLP spray system 12, and is adapted to engage with the quick coupler 36 of flexible hose 34, thus supplying the airflow from the turbine 44 to the spray gun 30.

Figure 11:
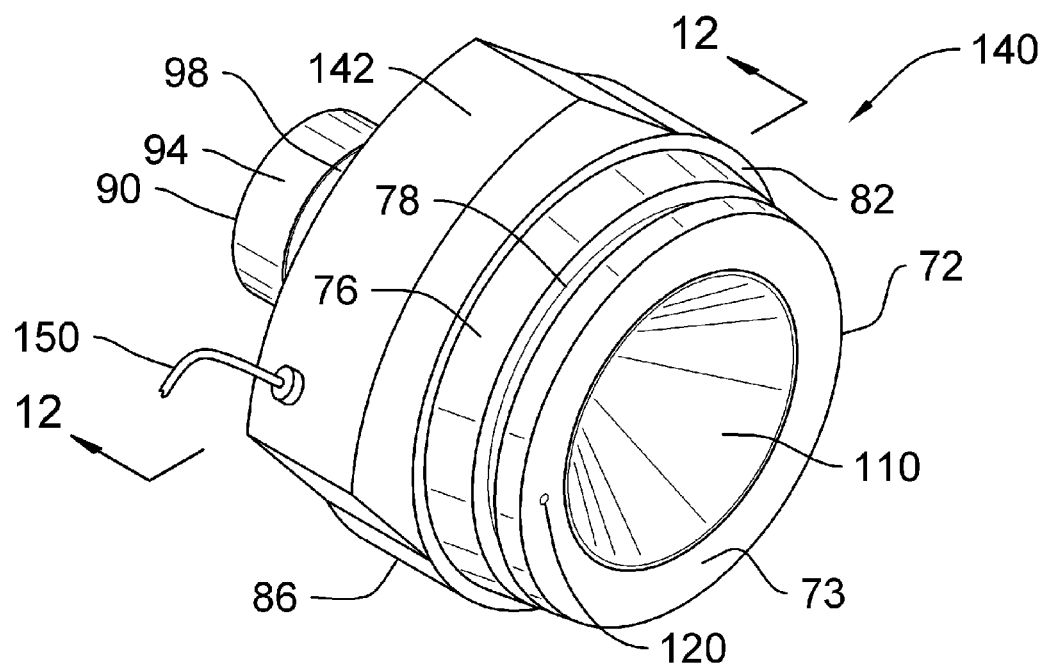
FIG. 11 is a perspective view of the alternate embodiment of the outlet fitting of the pressure differential motor control system of the present invention.
Figure 12:
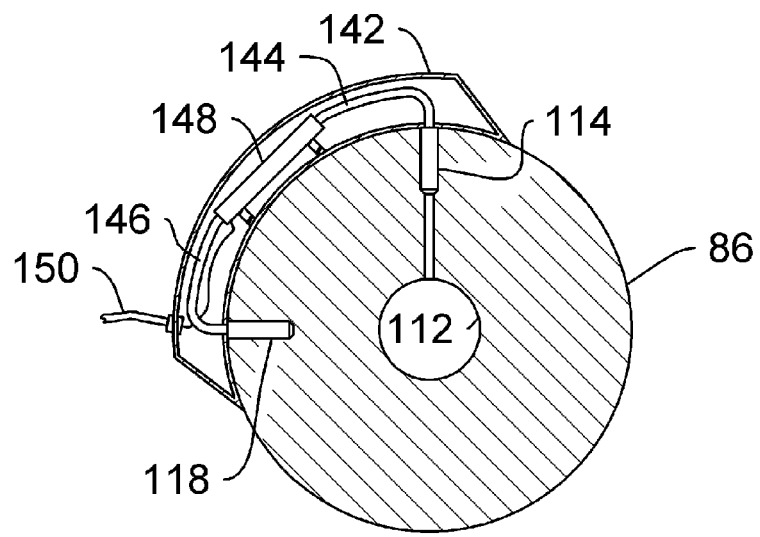
FIG. 12 is a cross-sectional view of the alternate embodiment of the outlet fitting of the pressure differential motor control system of the present invention taken along line 12-12 in FIG. 11.

Regarding FIGS. 11 and 12, the alternate embodiment outlet fitting 140 includes all the same elements as outlet fitting 70, as described above, but further incorporates a pressure switch assembly 142 integral therewith. The pressure switch assembly 142 is attached to the mid section 86 so as to cover the low and high pressure ports 114, 118. A low pressure line 144 is connected to and in fluid communication with the low pressure port 114 and a low pressure side of a pressure switch 148. The pressure switch 148 is positioned within the pressure switch assembly 142. A high pressure line 146 is connected to and in fluid communication with the high pressure port 118 and a high pressure side of the pressure switch 148. The pressure switch 148 is connected and in electrical communication with speed controller 50 and the multi-stage switch 52 via wiring 150.

In use, it can now be understood that a user would operate the HVLP spray system 12 by activating the main power switch 56 while it is receiving power from the power supply 28. Adjust the multi-stage switch 52 to a desired setting, and connect the spray gun 30 to the flexible hose 34, and the flexible hose 34 to the hose end section 90 of the outlet fitting 70. While the trigger of the spray gun 30 is in a closed condition, airflow from the turbine 44 travels through the outlet fitting 70 and flexible hose 34 to the spray gun 30 where it stops and air pressure increases within the turbine 44, outlet fitting 70, and flexible hose 34.

In the trigger closed condition the pressure at the high pressure bore 120 located in and in fluid communication with the turbine outlet 46 is substantially equal to the pressure at the low pressure bore 116 which is in fluid communication with the choked section 112. In this condition there is no pressure differential detected by pressure switch 58, 148 which is connected to the high pressure port 118 via high pressure line 60, and the low pressure port 114 via low pressure line 64. With no pressure differential the pressure switch 58, 148 does not send a signal to the speed controller 50, thereby operating the motor 42 at a lower speed.

When the user activates the trigger, and produces a trigger open condition, the airflow from the turbine 44 travels through the venturi 108 of the outlet fitting 70, through the flexible house 34 and out through the spray gun 30. In this trigger open condition, airflow from the turbine 44 impacts the high pressure port 120 at a pressure $P_1$ at a velocity $V_1$. The airflow then travels through the chamfered opening 111 of the high pressure section 110 having an area $A_1$, after which the airflow converges and increases velocity. The airflow then enters and travels through the choked section 112 which has an area $A_2$ at a velocity $V_2$ and pressure $P_2$.

In this trigger open condition, a pressure differential is produced between the high pressure port 120 and the low pressure port 116, and this pressure differential is transferred to the pressure switch 58 which closes upon detection of the pressure differential. This decrease in pressure through the venturi 108 is supported by Bernoulli's principle which states that for a fluid flow, an increase in the speed of the fluid occurs simultaneously with a decrease in pressure or a decrease in the fluid's potential energy. Furthermore, the fluid velocity $V_2$ must increase through the constriction (choked section 112) to satisfy the equation of continuity, while its pressure $P_2$ must decrease due to conservation of energy: the gain in kinetic energy is balanced by a drop in pressure or a pressure gradient force. An equation for the drop in pressure due to venturi effect may be derived from a combination of Bernoulli's principle and the equation of continuity.

Using the Bernoulli's equation in the special case of incompressible flows (such as the flow of water or other liquid, or low speed flow of gas), the theoretical pressure drop $(P_1-P_2)$ at the constriction or choked section 112 would be given by:

$$p_1 - p_2 = \frac{\rho}{2}(v_2^2 - v_1^2) \qquad \text{Equation 1}$$

where $\rho$ is the density of the fluid, $V_1$ is the (slower) fluid velocity where the chamfered opening 111 or the widest diameter $A_1$ of the high pressures section 110 is wider, $V_2$ is the (faster) fluid velocity where the choked section 112 is narrower $A_2$.

The conservation of energy states that the total amount of energy in an isolated system remains constant. Therefore the continuity equation would be given by:

$$\frac{\partial \rho}{\partial t} + \nabla \cdot (\rho v) = 0 \qquad \text{Equation 2}$$

In the case of an incompressible fluid, p is a constant and the equation reduces to:

$$\nabla \cdot v = 0 \qquad \text{Equation 3}$$

Therefore, since:

$$Q = v_1 A_1 = v_2 A_2 \qquad \text{Equation 4}$$

then the pressure differential $\Delta P = (P_1-P_2)$ is then based on the Bernoulli equation (Equation 1) conservation of energy, and the continuity equation (Equation 2) to produce the venturi equation given by:

$$Q = A_1 \sqrt{\frac{2(p_1-p_2)}{\rho\left(\left(\frac{A_1}{A_2}\right)^2 - 1\right)}} = A_2 \sqrt{\frac{2(p_1-p_2)}{\rho\left(1-\left(\frac{A_2}{A_1}\right)^2\right)}} \qquad \text{Equation 5}$$

where Q is the volumetric flow rate, which is known by the turbine assembly 40.

Equation 5 can then be arranged to solve for pressure differential $\Delta P$ by the following:

$$(p_1-p_2) = \frac{\rho}{2} \times \left(1 - \left(\frac{A_2}{A_1}\right)^2\right) \left(\frac{Q}{A_2}\right)^2 \qquad \text{Equation 6}$$

The closing of pressure switch 58 completes a circuit from the multi-stage switch 52 to the speed controller 50 which then increases the speed of the motor 42 to a higher speed of that from the trigger closed condition.

The present invention infers the state of airflow to the spray gun and creates a signal, produced from a pressure differential, within the HVLP spray system, then directs this signal to a speed controller connected in a power circuit of the motor. This allows the motor to have a lower speed when airflow is blocked by the spray gun in a trigger closed condition, and then accelerate the airflow to a normal working speed when the trigger is in an open condition. The controlling of the motor scientifically reduces excess heat produced by the constant high speed running of the motor, thereby increasing motor life and HVLP spray system reliability.

The HVLP spray system can be operated at a single speed or multiple speed settings, depending on position of the multi-stage switch. It can be appreciated that a single speed will be most cost effective, but multiple speeds will facilitate adjustment of the HVLP spray system to suit many different products and working conditions. The HVLP spray system can be used to spray fluids, such as paint, onto a surface.

Other advantages of the present invention is reduced overall noise from the motor, and reduced energy consumption when the trigger is in the closed condition and the HVLP spray system is effectively in a stand-by state. A comparable test of the present invention to a known blow off valve spray unit has discovered a saving of about 20 to over 40%, depending on the speed selected and other variables in operating condition.

While a preferred embodiment of the pressure differential motor control system and method has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although controlling an HVLP motor by pressure differential has been described, it should be appreciated that the pressure differential motor control system and method herein described is also suitable for controlling any electrically connected device by a pressure differential signal produced by venturi.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pressure differential motor control for controlling the operation of a motor responsive to a pressure differential of a fluid, said pressure differential motor control comprising:
a motor operable with a positive fluid pressure source assembly;
an outlet fitting in fluid communication with said positive fluid pressure source assembly, said outlet fitting comprising a venturi defined therethrough along a longitudinal axis of said outlet fitting, a low pressure port defined through said outlet fitting and in fluid communication with said venturi, and a high pressure port defined through said outlet fitting and in fluid communication with an exterior of said outlet fitting; and
a switch in electrical communication with said motor and in fluid communication with said low and high pressure ports of said outlet fitting, said switch being operable by a pressure differential between said low and high pressure ports of said outlet fitting;
wherein said outlet fitting comprising at least a first section and a mid section adjacent said first section, said low and high pressure ports each being defined in said mid section respectively, said high pressure port further comprising a high pressure bore defined through said first section and an end face of said first section, said high pressure bore being parallel with the longitudinal axis of said outlet fitting.

2. The pressure differential motor control according to claim 1 further comprising a motor controller and a multi-stage switch, said motor controller being in electrical communication with said motor and said switch, said multi-stage switch being in electrical communication with said switch and said motor controller.

3. The pressure differential motor control according to claim 1, wherein said outlet fitting further comprising a second section adjacent said mid section, said mid section having a diameter at least that of said first section, said second section having a diameter less than said mid section thereby forming an edge perpendicular to the longitudinal axis of said outlet fitting.

4. The pressure differential motor control according to claim 3, wherein said first section comprising an end face opposite said mid section, and a groove defined in said first section radially around its circumference and located between said mid section and said end face of said first section.

5. The pressure differential motor control according to claim 4, wherein said first section having a substantially tapered configuration that tapers outwardly from said end face of said first section to said mid section, said first section being attachable to an outlet of said positive fluid pressure source assembly.

6. The pressure differential motor control according to claim 5, wherein said diameter of said mid section being larger than said first section thereby producing an edge perpendicular to the longitudinal axis of said outlet fitting.

7. The pressure differential motor control according to claim 5 further comprising a seal ring configured to be received in said groove of said first section, said seal ring being configured to sealably engage with said outlet of said positive pressure fluid source assembly.

8. The pressure differential motor control according to claim 3, wherein said second section being configured to be removably coupled with a conduit.

9. The pressure differential motor control according to claim 8, wherein said second section further comprising an end face opposite said mid section, and a groove defined in said second section radially around its circumference and located between said mid section and said end face of said second section, wherein said second section and said groove of said second section being configured to removably and sealingly engage with a quick coupler of said conduit.

10. The pressure differential motor control according to claim 3, wherein said venturi at least comprising a high pressure section, and a choked section adjacent and in fluid communication with said high pressure section, said high pressure section having a substantially tapered configuration converging from said end face of said first section of said outlet fitting to said choked section, said choked section being defined at least in said mid section and being in fluid communication with said low pressure port.

11. The pressure differential motor control according to claim 10, wherein said venturi further comprising a diverging section adjacent said choked section, and an outlet section adjacent said diverging section.

12. The pressure differential motor control according to claim 1, wherein said motor and said positive fluid pressure source assembly being a high volume low pressure (HVLP) spray device, and wherein said outlet fitting being configured to be removably coupled with a conduit is a flexible hose, said flexible hose being attachable to a spray gun that is in fluid communication with said positive fluid pressure source assembly via said flexible hose and said outlet fitting.

13. A pressure differential motor control system comprising:
a high volume low pressure (HVLP) spray device having at least a motor operable with a positive fluid pressure source assembly;
an outlet fitting attachable and in fluid communication with said positive fluid pressure source assembly, said outlet fitting comprising a first section attachable to an outlet of said positive fluid pressure source assembly, a mid section adjacent said first section, a second section adjacent said midsection, a venturi defined therethrough along a longitudinal axis of said outlet fitting, a low pressure port defined through said mid section and in fluid communication with said venturi, and a high pressure port defined in said mid section and in fluid communication with a high pressure bore defined through said mid section and said first section and in fluid communication with an exterior of said outlet fitting; and
a switch in electrical communication with said motor and in fluid communication with said low and high pressure ports of said outlet fitting, said switch being operable by a pressure differential from said low and high pressure ports of said outlet fitting;
a motor controller in electrical communication with said motor and said switch; and
a multi-stage switch in electrical communication with said switch and said motor controller;
wherein said motor controller being configured to control the operation of said motor in response to at least said switch and said multi-stage switch.

14. The pressure differential motor control system according to claim 13, wherein said first section comprising an end face opposite said mid section, and a groove defined in said first section radially around its circumference and located between said mid section and said end face of said first section, said groove being configured to receive a seal ring for sealably engage with said outlet of said positive pressure fluid source assembly, said first section having a substantially tapered configuration that tapers outwardly from said end face of said first section to said mid section.

15. The pressure differential motor control system according to claim 13, wherein said mid section having a diameter larger than said first section thereby producing an edge perpendicular to the longitudinal axis of said outlet fitting.

16. The pressure differential motor control system according to claim 13, wherein said second section further comprising an end face opposite said mid section, and a groove defined in said second section radially around its circumference and located between said mid section and said end face of said second section, wherein said second section and said groove of said second section being configured to removably and sealingly engage with a quick coupler of a conduit.

17. The pressure differential motor control system according to claim 13, wherein said venturi comprising a high pressure section, a choked section adjacent and in fluid communication with said high pressure section, a diverging section adjacent said choked section, and an outlet section adjacent said diverging section, said high pressure section having a substantially tapered configuration converging from said end face of said first section of said outlet fitting to said choked section, said choked section being defined at least in said mid section and being in fluid communication with said low pressure port.

18. A method of using a pressure differential motor control to control motor operations, said method comprising the steps of:
a) providing an outlet fitting attachable and in fluid communication with a positive fluid pressure source assembly, said outlet fitting comprising a venturi defined therethrough along a longitudinal axis of said outlet fitting, a low pressure port defined through a mid section of said outlet fitting and in fluid communication with said venturi, and a high pressure port defined through said mid section and in fluid communication with an exterior of said outlet fitting, said high pressure port further comprising a high pressure bore defined through an end face of a first section of said outlet fitting, said high pressure bore being parallel with a longitudinal axis of said outlet fitting; and a switch in electrical communication with a motor and in fluid communication with said low and high pressure ports of said outlet fitting;
b) producing a fluid flow by activating said motor to drive said positive fluid pressure source assembly;
c) directing said fluid flow through said venturi of said outlet fitting;
d) decreasing the pressure of said fluid flow in said venturi by increasing the velocity of said fluid flow in said venturi;
e) directing a portion of the decreased pressure fluid flow in said venturi to said switch via said low pressure port;
f) directing ambient pressure exterior of said outlet fitting to said switch via said high pressure port;
g) activating said switch in response to a predetermined pressure differential from said low and pressure ports; and
h) controlling said motor via a motor controller in response to a signal from at least said switch.

\* \* \* \* \*